United States Patent
Kaiser et al.

(10) Patent No.: US 9,203,284 B2
(45) Date of Patent: Dec. 1, 2015

(54) ROTOR COOLING STRUCTURES

(75) Inventors: Edward L. Kaiser, Orion, MI (US); Micah Joel Fuchs, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 793 days.

(21) Appl. No.: 13/372,887

(22) Filed: Feb. 14, 2012

(65) Prior Publication Data

US 2013/0207493 A1 Aug. 15, 2013

(51) Int. Cl.
*H02K 9/02* (2006.01)
*H02K 9/19* (2006.01)
*H02K 3/52* (2006.01)
*H02K 1/32* (2006.01)

(52) U.S. Cl.
CPC .................. *H02K 9/19* (2013.01); *H02K 3/527* (2013.01); *H02K 1/32* (2013.01); *H02K 2203/12* (2013.01)

(58) Field of Classification Search
CPC .............. H02K 1/32; H02K 9/12; H02K 9/16
USPC ............................................ 310/60 A, 61, 59
See application file for complete search history.

(56) References Cited

U.S. PATENT DOCUMENTS

| | | | | |
|---|---|---|---|---|
| 5,994,804 A * | 11/1999 | Grennan et al. | ............ | 310/60 R |
| 6,323,567 B1 * | 11/2001 | Hazelton et al. | ............ | 310/12.29 |
| 6,727,609 B2 * | 4/2004 | Johnsen | ............ | 310/52 |
| 6,879,069 B1 * | 4/2005 | Weidman et al. | ............ | 310/61 |
| 6,982,506 B1 * | 1/2006 | Johnsen | ............ | 310/61 |
| 7,411,323 B2 * | 8/2008 | Pfannschmidt et al. | ........ | 310/58 |
| 7,514,827 B2 * | 4/2009 | Hall | ............ | 310/61 |
| 7,598,635 B2 * | 10/2009 | Howard et al. | ............ | 310/61 |
| 7,994,668 B2 * | 8/2011 | Gerstler et al. | ............ | 310/61 |
| 8,080,908 B2 * | 12/2011 | Matsubara et al. | ............ | 310/61 |
| 2003/0030333 A1 * | 2/2003 | Johnsen | ............ | 310/54 |
| 2004/0080218 A1 * | 4/2004 | Weidman et al. | ............ | 310/61 |
| 2005/0012403 A1 * | 1/2005 | Binnard | ............ | 310/12 |
| 2006/0001322 A1 * | 1/2006 | Binnard | ............ | 310/12 |
| 2007/0200441 A1 * | 8/2007 | El-Antably et al. | ............ | 310/58 |

FOREIGN PATENT DOCUMENTS

| | | | |
|---|---|---|---|
| JP | 2004282902 A | 10/2004 | |
| JP | 2005006428 A | 1/2005 | |
| WO | 2010128632 A1 | 11/2010 | |

* cited by examiner

*Primary Examiner* — Naishadh Desai
(74) *Attorney, Agent, or Firm* — Quinn Law Group, PLLC

(57) ABSTRACT

A rotor defines an axial direction and a radial direction relative to an axis of rotation and includes an annular hub and a core disposed radially outward of the annular hub. The core defines a first axial side and a second axial side. First radial feed holes are formed in the annular hub, and are located between the first and second axial sides. Axial channels are formed between the core and the annular hub, and are in fluid communication with the first radial feed holes and span substantially between the first and second axial sides. The rotor also includes a first member and a second member, adjacent to the first and second axial sides, respectively. First and second apertures are formed in the first and second members, respectively. Each of the first and second apertures is in fluid communication with one of the axial channels.

8 Claims, 6 Drawing Sheets

ROTOR COOLING STRUCTURES

TECHNICAL FIELD

This disclosure relates to rotors used in electric machines.

BACKGROUND

A stator is the stationary part of an electric machine. The stator interacts with a rotor, which is the moving or rotating part of the electric machine. The stator and rotor allow the electric machine to convert mechanical energy to electrical energy (generator mode) and to convert electrical energy to mechanical energy (motor mode).

SUMMARY

A rotor is provided and defines an axial direction and a radial direction relative to an axis of rotation. The rotor includes an annular hub and a core disposed radially outward of the annular hub. The core defines a first axial side and a second axial side.

A plurality of first radial feed holes are formed in the annular hub. The first radial feed holes are located between the first axial side and the second axial side of the core. A plurality of axial channels are formed between the core and the annular hub. These axial channels are in fluid communication with the first radial feed holes and span substantially between the first axial side and the second axial side.

The rotor also includes a first member adjacent to the first axial side of the core, and a second member adjacent to the second axial side of the core. A plurality of first apertures are formed in the first member, and each of the first apertures is in fluid communication with one of the axial channels. A plurality of second apertures are formed in the second member, and each of the second apertures is in fluid communication with one of the axial channels.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
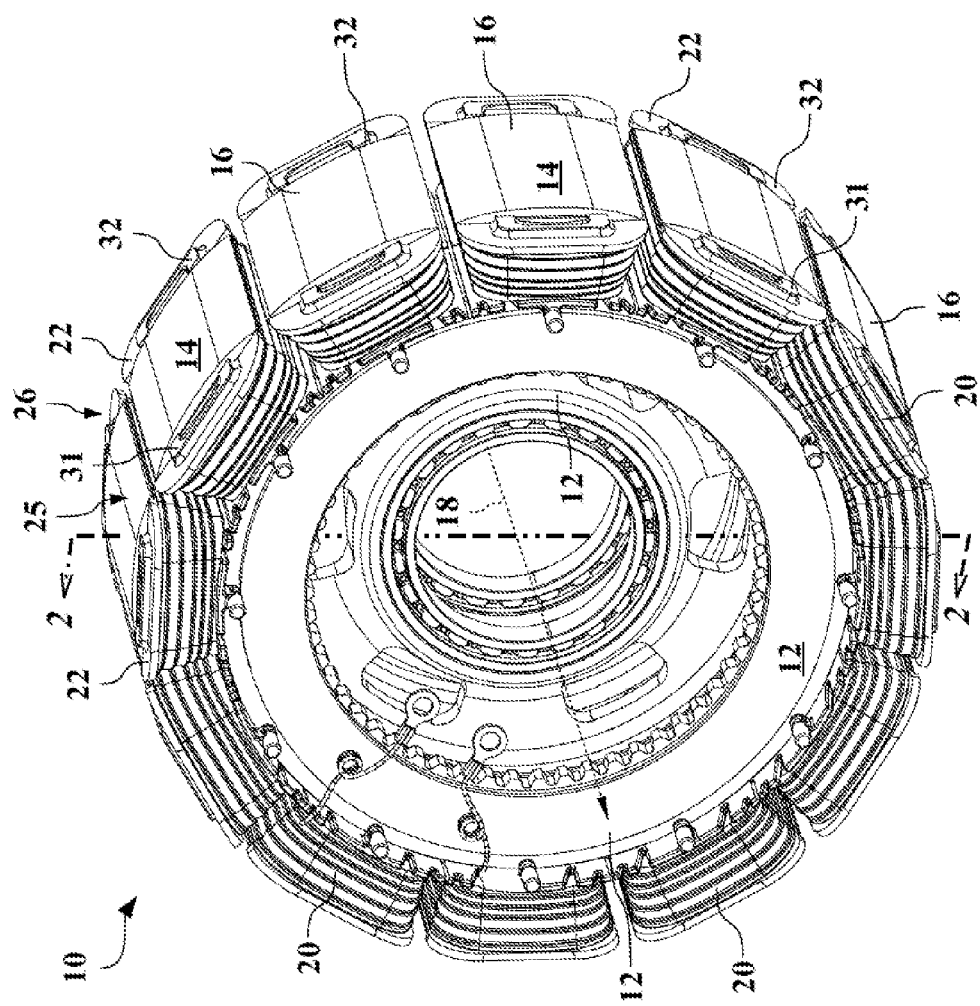
FIG. 1 is a schematic, isometric view of a wound rotor.
Figure 2:
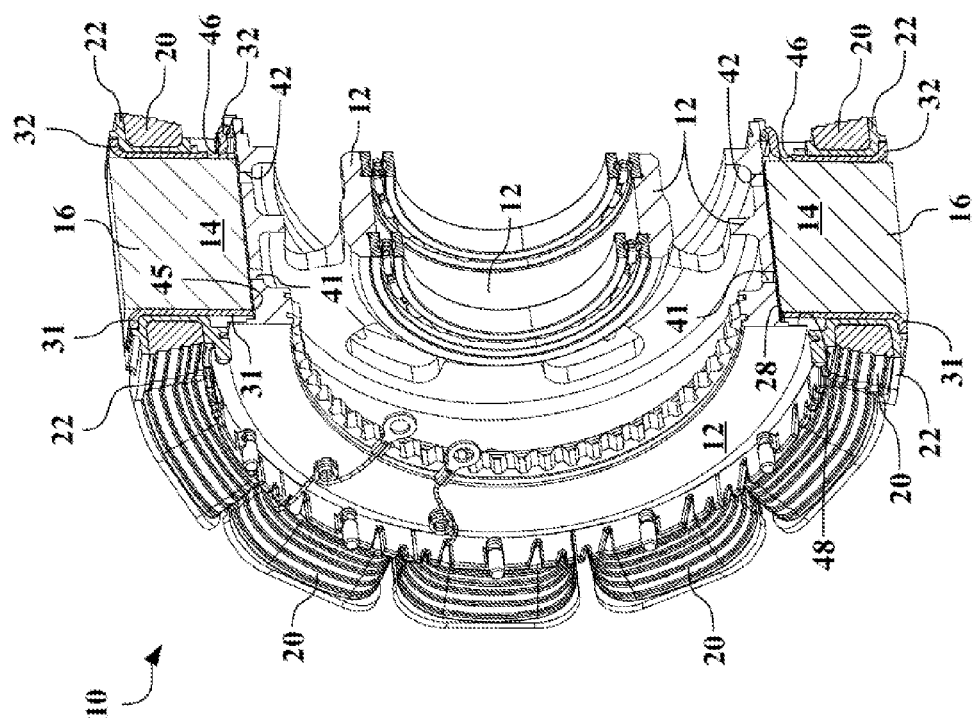
FIG. 2 is a schematic, cross-sectional view of the rotor shown in FIG. 1 taken along line 2-2.

Referring to the drawings, wherein like reference numbers correspond to like or similar components whenever possible throughout the several figures, there are shown in FIG. 1 and FIG. 2 two schematic views of a rotor 10, which may be used in an electric machine (not shown). The rotor 10 shown in FIGS. 1 and 2 is an internal, wound rotor, which cooperates with an external stator (not shown) in the electric machine.

FIG. 1 shows an isometric view of the rotor 10, substantially assembled. FIG. 2 shows a cross section of the rotor 10, taken along line 2-2 of FIG. 1. Features and components shown in other figures may be incorporated and used with those shown in FIG. 1 and FIG. 2, and components may be mixed and matched between any of the configurations shown.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The rotor 10 includes a hub 12 and a core 14, which has a plurality of rotor teeth 16. The core 14 is disposed radially outward of the hub 12, relative to an axis 18 of the rotor 10. The core 14 shown is formed as a solid, one-piece core, but may alternatively be formed as a segmented core or as a laminated (axially-layered) core, and may be formed of powdered metal, cast, or machined.

The rotor 10 rotates about the axis 18 during operation of the electric machine. The stator of the electric machine would share substantially the same axis 18. For cylindrical coordinates, in addition to the axis 18, the rotor 10 also defines a radial direction, which extends perpendicularly outward from the axis 18, and an angular axis or a tangential axis, which is in the direction of rotation about the radial direction. The rotor 10 may also use Cartesian coordinates, with the axis 18 being the z-axis, and also defining an x-axis (not shown) and a y-axis (not shown), both of which are perpendicular to the axis 18.

The rotor 10 includes a plurality of windings 20 that are wrapped around the rotor teeth 16, and extend axially beyond the core. The windings 20 are shown as a single block of material, but may be formed from wires or bar conductors that are then looped or twisted around the rotor teeth 16.

Figure 3:
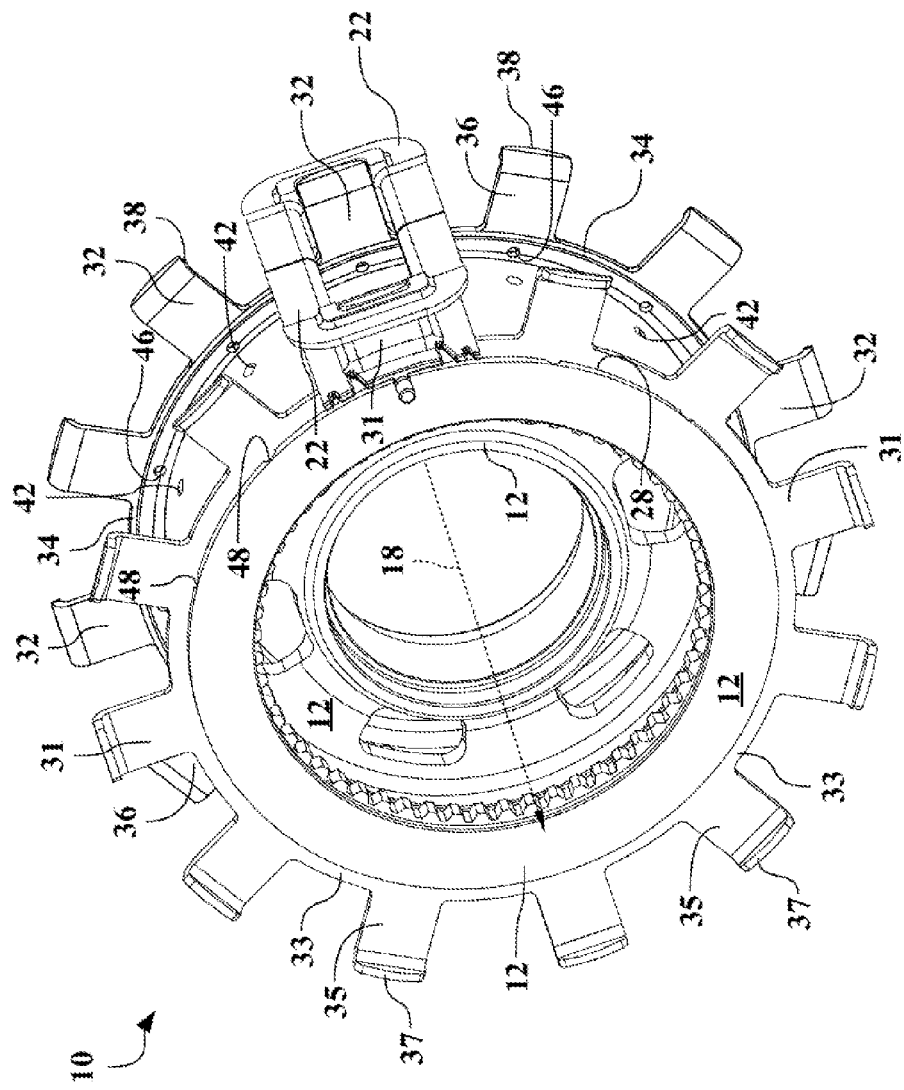
FIG. 3 is a schematic, isometric view of the rotor shown in FIG. 1, shown with a core hidden from view to better illustrate a first support ring and a second support ring.
Figure 4:
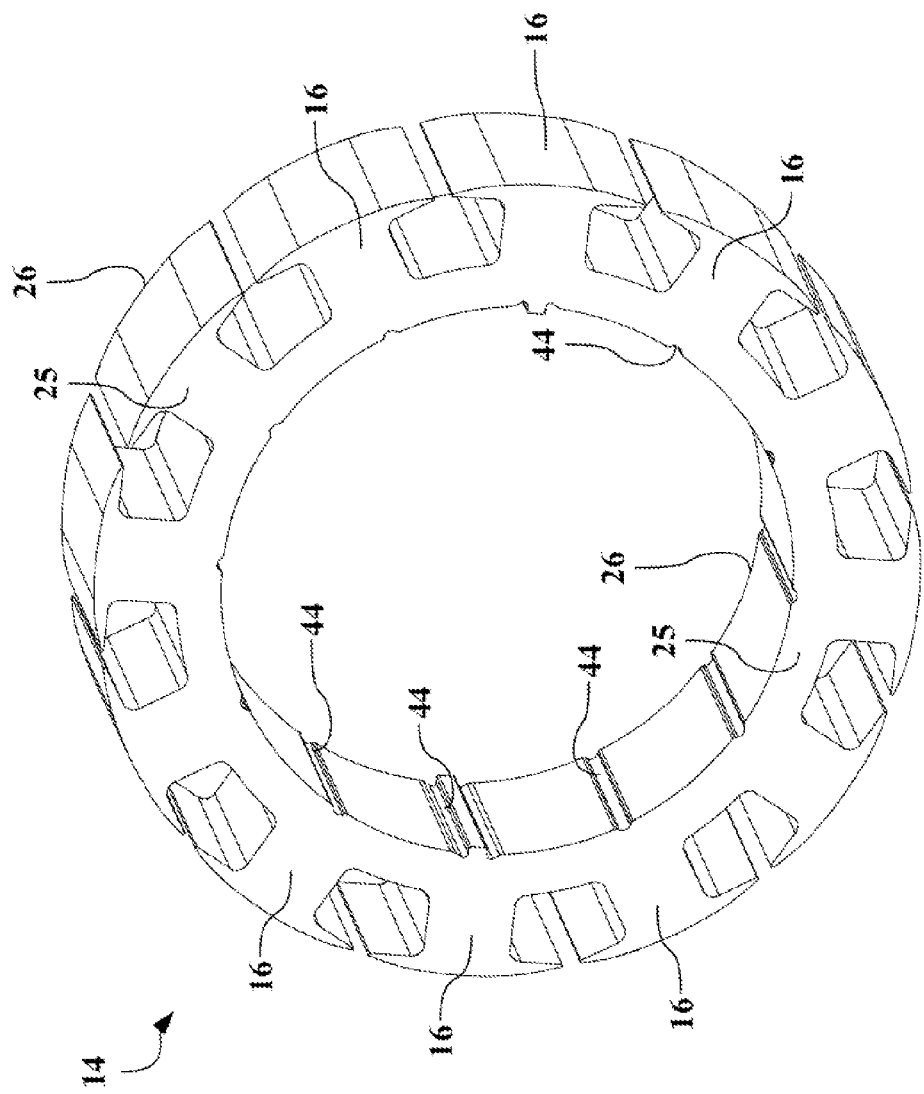
FIG. 4 is a schematic, isometric view of the core of the rotor shown in FIG. 1.
Figure 5:
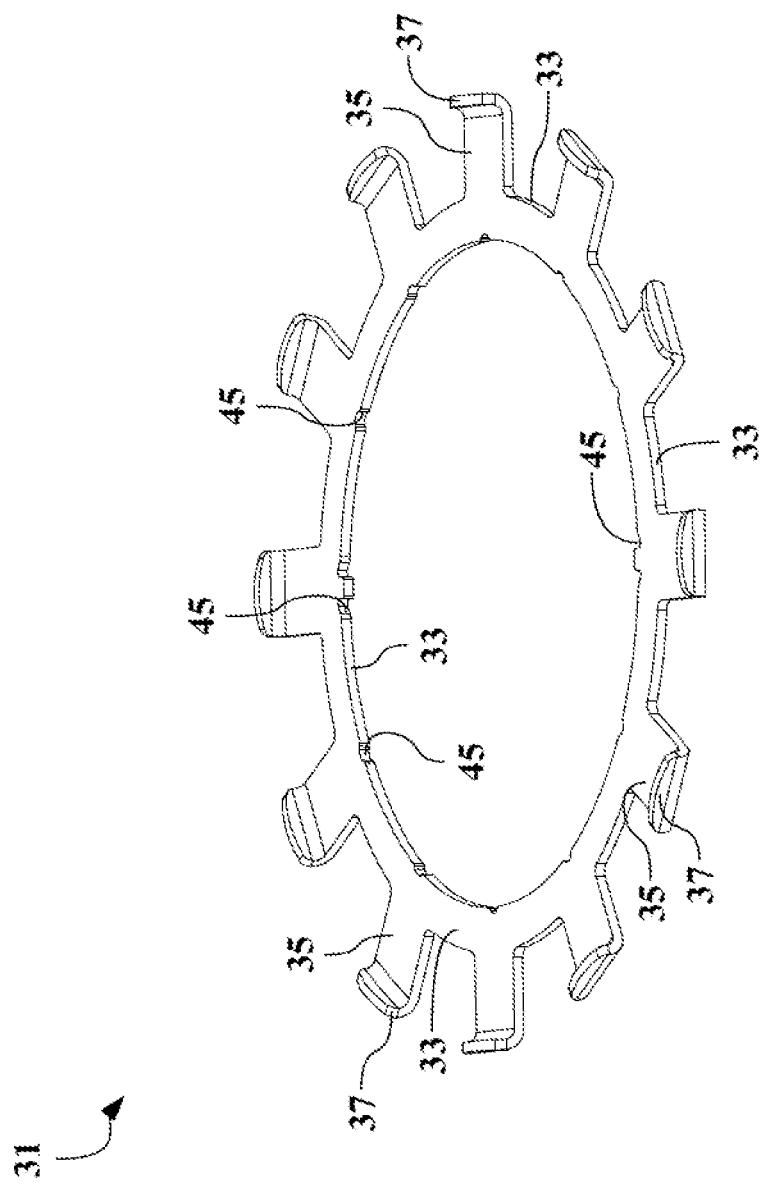
FIG. 5 is a schematic, isometric view of the second support ring of the rotor shown in FIG. 1.
Figure 6:
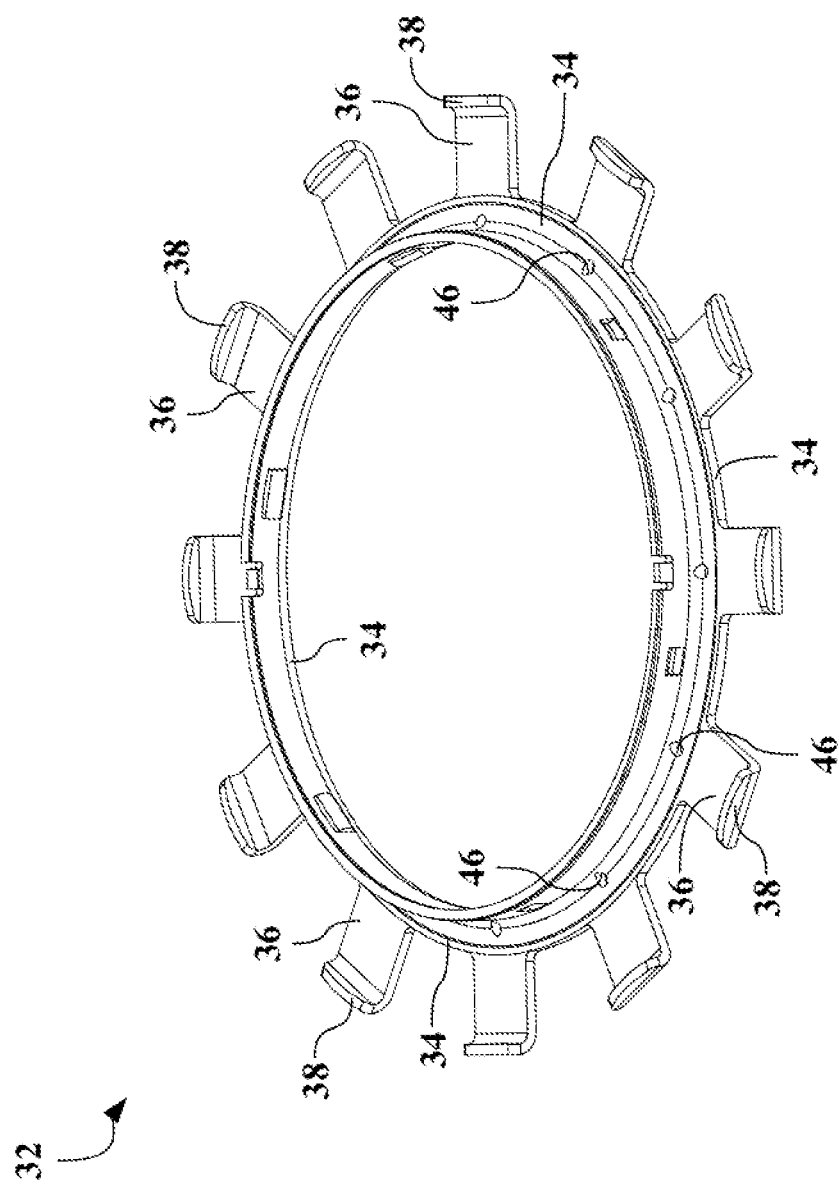
FIG. 6 is a schematic, isometric view of the first support ring of the rotor shown in FIG. 1.

Referring now to FIG. 3, FIG. 4, FIG. 5, and FIG. 6, and with continued reference to FIGS. 1-2, there are shown additional views of various components of the rotor 10 shown in FIGS. 1-2. FIG. 3 shows another isometric view of portions of the rotor 10. However, in FIG. 3 the core 14 and the windings 20 are hidden from view to better illustrate a first support ring 31 and a second support ring 32 of the rotor 10, which are described in more detail herein. FIG. 4 shows an isometric view of only the core 14. FIG. 5 shows an isometric view of the first support ring 31. FIG. 6 shows an isometric view of the second support ring 32.

As best viewed in FIG. 3, the rotor 10 also includes a plurality of bobbin segments or bobbins 22, each of which substantially surrounds one of the rotor teeth 16. The bobbins 22 may provide an insulating layer between the windings 20 and the rotor teeth 16. The bobbins 22 may also provide structural support for the windings.

As best viewed in FIG. 4, the core 14, also the remainder of the rotor 10, defines a first axial side 25 and a second axial side 26 of the rotor teeth 16. Relative sides or axial directions of the rotor 10 and the hub 16 may also be identified by the first axial side 25 and the second axial side 26. Designation as first or second may occur in any order and is not limiting of any specific component. The bobbin rings 22 are between the windings 20 and the rotor teeth 16 on the first axial side 25 and the second axial side 26 of the core 14. On the side of the hub 12 adjacent to the first axial side 25 of the core 14, an annular shelf 28 extends radially outward from the hub 12.

The rotor 10 includes the first support ring 31 and the second support ring 32. As shown in FIG. 3, the first support ring 31 and the second support ring 32 are disposed on opposite sides of the core 14, axially. The first support ring 31 and the second support ring 32 are in contact with at least the hub 12, and may also be in contact with the core 14 and the bobbins 22, as shown in FIG. 2.

The first support ring 31 includes an annular base or first disc 33 and the second support ring 32 includes a second disc 34 or annular base. The first disc 33 and the second disc 34 are in contact with the hub 12 and are configured to transfer loads from the first support ring 31 and the second support ring 32 to the hub 12.

A plurality of first fingers 35 extend radially outward from the first disc 33, and a plurality of second fingers 36 extend radially outward from the second disc 34. In the configuration of the rotor 10 shown in the figures, each of the first fingers 35 corresponds to one of the windings 20 and is generally aligned with one of the rotor teeth 16. Similarly, on the opposing side of the core 14, each of the second fingers 36 corresponds to one of the windings 20. For the rotor 10, the first support ring 31 and the second support ring 32 are not identical but do share many similar features.

As best viewed in FIG. 3 and FIG. 5, a plurality of first loaded edges 37 extend axially from the first fingers 35 of the first support ring 31. The first loaded edges 37 are disposed radially outward of the windings 20, such that radial loads from the windings 20 are transferred—at least partially—to the load edges 37 of the first support ring 31. Similarly, a plurality of second loaded edges 38 extend axially from the second fingers 36 and are disposed radially outward of the windings 20, such that radial loads from the windings 20 are transferred—at least partially—to the load edges 38 of the second support ring 32.

The first loaded edges 37 and second loaded edges 38 are cantilevered from the first fingers 35 and the second fingers 36, respectively, in the configuration of the rotor 10 shown. However, other shapes may be used to allow transfer of radial loads from the windings 20 to the first support ring 31 and the second support ring 32 and, therefore, to the hub 12. For example, and without limitation, the first loaded edges 37 and second loaded edges 38 may also be formed with a rounded or hooked shape (i.e., similar to a shepherd's hook or a candy cane) extending from the first fingers 35 and the second fingers 36, respectively. Additionally, the first loaded edges 37 and second loaded edges 38 need not be identical.

Radial loads are transferred from the windings 20 to the bobbins 22. Without the first support ring 31 and the second support ring 32, all of the radial loads from the winding 20 would be transferred to the rotor teeth 16 and the core 14—possibly through the bobbins 22 as an intermediary. However, the first support ring 31 and the second support ring 32 absorb or react some of the radial loads from the windings 20. This configuration reduces and distributes the loads transferred to the bobbins 22 and the rotor teeth 16 of the core 14.

In the configuration of the rotor 10 shown, the first fingers 35 are disposed between the windings 20 and the first axial side 25 of the rotor teeth 16, and the second fingers 36 are disposed between the windings 20 and the second axial side 26 of the rotor teeth 16. Furthermore, the bobbins 22 are disposed between the windings 20 and the first and second fingers 35, 36. Therefore, radial loads from the windings 20 are transferred first to the bobbins 22 and then to the first and second fingers 35, 36.

The first support ring 31 may be formed as a unitary component, such that the first disc 33, the first fingers 35, and the first loaded edges 37 are formed as one piece. Furthermore, the first support ring 31 may be a stamped component. Similarly, the second support ring 32 may be stamped as a unitary component, such that the second disc 34, the second fingers 36, and the second loaded edges 38 are formed as a one-piece stamping.

The first support ring 31 and the second support ring 32 may be formed from substantially-nonmagnetic materials. If the first support ring 31 and the second support ring 32 are substantially nonmagnetic, the first support ring 31 and the second support ring 32 may not alter the magnetic response of the windings 20 during operation of the rotor 10 in the electric machine. The bobbins 22 may also be formed from nonmagnetic or insulating materials. For example, and without limitation, the bobbins 22 may be formed from resin and the first support ring 31 and the second support ring 32 may be formed from stainless steel.

For the rotor 10 shown, the second support ring 32 may be press-fit onto the hub 12. Therefore, the first support ring 31 is trapped between the annular shelf 28 and the first axial side 25 of the core 14. Then the second support ring 32 is press-fit onto the hub 12, such that the second support ring 32 traps the core 14 and the first support ring 31 against the annular shelf 28 of the hub 12.

The rotor 10 also includes structures to control the flow of cooling fluids through the rotor 10. Depending upon the location and use of the rotor 10—such as within a hybrid transmission (not shown) or adjacent to an engine (not shown)—the rotor 10 may be cooled by different fluids. Some fluids that may be used include, without limitation, automatic transmission fluid (ATF) or oil.

As the rotor 10 rotates, cooling fluid is generally forced radially outward from the axis 18. The cooling fluid may be supplied radially inward of the hub 12. A plurality of first radial feed holes 41 are formed in the annular hub 12. The first radial feed holes 41 allow fluid to flow radially through (from inside to outside) the hub 12. The first radial feed holes 41 are located between the first axial side 25 and the second axial side 26 of the core 14.

A plurality of axial channels 44 are formed between the core 14 and the annular hub 12. In the embodiment of the rotor 10 shown, the axial channels 44 are formed on the interior of the core 14. However, the axial channels 44 may also be formed on the exterior of the hub 12. The axial channels 44 are in fluid communication with the first radial feed holes 41 and span substantially between the first axial side 25 and the second axial side 26 of the core 14. Therefore, the axial channels 44 distribute cooling fluid supplied by the first axial feed holes 41 to both sides of the rotor 10.

Depending upon the configuration of the rotor 10, there may also be a plurality of second radial feed holes 42 formed in the annular hub 12, as shown in the figures. The second radial feed holes 42 are also located between the first axial side 25 and the second axial side 26 of the core 14 and are in fluid communication with the axial channels 44. Therefore, the axial channels 44 distribute cooling fluid supplied by both the first axial feed holes 41 and the second axial feed holes 42 to both sides of the rotor 10.

In the configuration of the rotor 10 shown, there is a first member, such as the first support ring 31, adjacent to the first axial side 25 of the core 14, and a second member, such as the second support ring 32, adjacent to the second axial side 26 of the core 14. The flow of cooling fluid through the axial channels 44 may be routed or adjusted by the first support ring 31 and the second support ring 32.

A plurality of first apertures 45 are formed in the first support ring 31. Each of the first apertures 45 are in fluid communication with one of the axial channels 44. Furthermore, a plurality of second apertures 46 are formed in the second support ring 32. Each of the second apertures 46 are in fluid communication with one of the axial channels 44.

The cooling fluid passes through the first axial feed holes 41 and the second axial feed holes 42 to both sides of the rotor 10 via the axial channels 44. Then, the first apertures 45 and the second apertures 46 allow cooling fluid to be communicated to the windings 20 of the rotor 10. Cooling the windings 20 may improve the performance and durability of the rotor 10.

Note that the rotor 10 may have conductive structures, such as bars, instead of the windings 20. In such configurations, the cooling fluid may be similarly passed to both the first axial side 25 and the second axial side 26 of the core 14, but will be used to cool the other conductive elements. Similarly, permanent magnets used in internal permanent magnets rotors may be cooled by the directed routing of cooling fluid from the hub 12 to both sides of the core 14.

The second radial feed holes 42, for example, may be sized to have significantly greater flow rates than the first radial feed holes 41, which may result in imbalances of cooling fluid being communicated to the second axial side 26. However, tuning the size and shape of the first apertures 45 and the second aperture 46 may allow fluid flow to be biased towards the first axial side 25, the second axial side 26, or balanced between both sides. Tuning may be used to control which side the majority of the fluid comes from. Greater flows of cooling fluid to windings 20 adjacent the second axial side 26 may cause that side of the windings 20 to be significantly lower in temperature than the windings 20 adjacent the first axial side 25.

The first apertures 45 may be sized to allow a first flow rate to the first axial side 25 of the rotor 10, and the second apertures 46 may be sized to allow a second flow rate to the second axial side 26 of the rotor 10. The total of the first flow rate and the second flow rate is a combined flow rate, which is the total flow rate from the first radial feed holes 41 and the second radial feed holes 42 through the axial channels 44. The size and shape of the first apertures 45 and the second apertures 46 may be tuned such that the first flow rate and the second flow rate are different or such that the first flow rate and the second flow rate are substantially equal, regardless of whether there are different flow rates from the first radial feed holes 41 and the second radial feed holes 42.

Therefore, the first apertures 45 and the second apertures 46 may be tuned to minimize imbalances, such that neither flow rate is greater than seventy percent of the combined flow rate. In some rotors 10, the first apertures 45 and the second apertures 46 may be tuned for balanced flow rates, such that neither flow rate is greater than sixty percent of the combined flow rate. The rotor 10 may be configured for fully-balanced flow, such that the flow rates are substantially equal.

The second apertures 46 may be sized to restrict the second flow rate relative to the first flow rate of the first apertures 45. Restricting the second flow rate may cause pressure to build in the axial channels 44 and to increase the first flow rate to the first axial side 25. Therefore, even with the second axial feed holes 42 providing eighty percent of the cooling fluid to the axial channels 44, the second flow rate through the second apertures 46 may be between fifty to sixty percent of the combined flow rate, such that each side of the rotor 10 receives similar cooling fluid flow.

The rotor 10 may also include a plurality of third apertures 48. Unlike the first apertures 45 and the second apertures 46, which are formed in the first support ring 31 and the second support ring 32, the third apertures 48 are formed in the annular hub 12. The third apertures 48 are formed adjacent to the first apertures 45 of the first support ring 31 and, if present, affect the first flow rate to the first axial side.

If the rotor 10 has windings 20 wrapped around rotor teeth 16, as opposed to internal permanent magnets or as-cast conductors, each of the axial channels 44 may correspond to one of the rotor teeth 16. As shown in FIG. 4, the axial channels 44 may be on the inner diameter of the core 14, circumferentially centered under individual rotor teeth 16. Alternatively, the axial channels 44 may be formed on the outer diameter of the hub 12, adjacent to the core 14. In configurations without rotor teeth 16, there may be additional or fewer axial channels 44 relative to the conductors (and relative to each of the magnetic poles).

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A rotor defining an axial direction and a radial direction relative to an axis of rotation, comprising:
   an annular hub;
   a core disposed outward of the annular hub in the radial direction relative to the axis of the rotor and in direct contact with the annular hub, wherein the core has a first axial side and a second axial side;
   a plurality of first radial feed holes formed in the annular hub, wherein the first radial feed holes are located between the first axial side and the second axial side of the core;
   a plurality of axial channels formed in one of the core and the annular hub such that the axial channels are formed between the core and the annular hub and are in direct contact with both the core and the annular hub, wherein the axial channels are in fluid communication with the first radial feed holes and span substantially between the first axial side and the second axial side of the core;
   a first member adjacent to the first axial side of the core;
   a second member adjacent to the second axial side of the core;
   a plurality of first apertures formed in the first member, wherein each of the first apertures are in fluid communication with one of the axial channels; and
   a plurality of second apertures formed in the second member, wherein each of the second apertures are in fluid communication with one of the axial channels.

2. The rotor of claim 1, further comprising:
   a plurality of second radial feed holes formed in the annular hub, wherein the second radial feed holes are located between the first axial side and the second axial side of the core and are in fluid communication with the axial channels.

3. The rotor of claim 2,
   wherein the first apertures are sized to allow a first flow rate from the axial channels to the first axial side of the core, and the second apertures are sized to allow a second flow rate to the second axial side of the core, such that the sum of the first flow rate and the second flow rate is a combined flow rate through the axial channels, and
   wherein both the first flow rate and the second flow rate are less than seventy percent of the combined flow rate.

4. The rotor of claim 3, further comprising a plurality of third apertures formed in the annular hub adjacent to the first apertures of the first member.

5. The rotor of claim 4, further comprising:
a plurality of rotor teeth extending radially outward from the core, and
wherein each of the axial channels is radially coincident with one of the rotor teeth,
wherein the first member is a first support ring having a plurality of first fingers, each of which is aligned with one of the rotor teeth, and
wherein the second member is a second support ring having a plurality of second fingers, each of which is aligned with one of the rotor teeth.

6. The rotor of claim 5, wherein both the first flow rate and the second flow rate are less than sixty percent of the combined flow rate.

7. A rotor defining an axial direction and a radial direction relative to an axis of rotation, comprising:
an annular hub;
a core disposed outward of the annular hub in the radial direction relative to the axis of the rotor and in direct contact with the annular hub, wherein the core has a first axial side and a second axial side;
a plurality of rotor teeth extending radially outward from the core;
a plurality of windings, wherein each of the windings is wrapped around one of the rotor teeth;
a plurality of first radial feed holes formed in the annular hub, wherein the first radial feed holes are located between the first axial side and the second axial side of the core;
a plurality of axial channels formed between the core and the annular hub such that the axial channels are in direct contact with the core and with the annular hub, wherein the axial channels are in fluid communication with the first radial feed holes and span substantially between the first axial side and the second axial side of the core, and wherein each of the axial channels is radially coincident with one of the rotor teeth;
a first support ring adjacent to the first axial side of the core and having a plurality of first fingers, wherein the first fingers of the first support ring are disposed between the windings and the rotor teeth;
a second support ring adjacent to the second axial side of the core and having a plurality of second fingers, wherein the second fingers of the second support ring are disposed between the windings and the rotor teeth;
a plurality of first apertures formed in the first support ring, wherein each of the first apertures are in fluid communication with one of the axial channels; and
a plurality of second apertures formed in the second support ring, wherein each of the second apertures are in fluid communication with one of the axial channels.

8. The rotor of claim 7,
wherein the first apertures are sized to allow a first flow rate from the axial channels to the first axial side of the core, and the second apertures are sized to allow a second flow rate to the second axial side of the core, such that the sum of the first flow rate and the second flow rate is a combined flow rate through the axial channels, and
wherein both the first flow rate and the second flow rate are less than sixty percent of the combined flow rate.

* * * * *